United States Patent [19]

George, II et al.

[11] Patent Number: 5,287,919
[45] Date of Patent: Feb. 22, 1994

[54] HEAT EXCHANGER

[75] Inventors: Paul E. George, II, Dublin, Ohio; John S. Barnhart, Champaign, Ill.

[73] Assignee: Gas Research Institute, Chicago, Ill.

[21] Appl. No.: 953,557

[22] Filed: Sep. 29, 1992

[51] Int. Cl.$^5$ ............................................... F28F 3/12
[52] U.S. Cl. .................................... 165/170; 165/185
[58] Field of Search .............................. 165/170, 185

[56] References Cited

U.S. PATENT DOCUMENTS

| | | | |
|---|---|---|---|
| 600,227 | 3/1898 | Knispel et al. | 165/170 |
| 2,161,293 | 6/1939 | Heath | 165/170 X |
| 2,573,583 | 10/1951 | Lester | 165/170 X |
| 3,181,607 | 5/1965 | Cospen | 165/170 |
| 3,209,677 | 10/1965 | Nanna | 99/374 |
| 3,312,161 | 4/1967 | Nanna | 99/377 |
| 3,330,334 | 7/1967 | Jansen et al. | 165/170 X |
| 4,245,147 | 1/1981 | Cummings et al. | 219/462 |
| 4,478,277 | 10/1984 | Friedman et al. | 165/185 |
| 4,955,361 | 9/1990 | Sontani et al. | 126/374 |

FOREIGN PATENT DOCUMENTS 3411523 10/1984 Fed. Rep. of Germany ...... 165/170

Primary Examiner—Allen J. Flanigan
Attorney, Agent, or Firm—Watkins, Dunbar & Pollick

[57] ABSTRACT

A gas-fired apparatus for high-volume commercial cooking comprises double-sided griddles, each having a lower platen with a horizontal top cooking surface and an upper platen with a bottom cooking surface. The upper platen of each griddle is moved into a horizontal position in contact with the food, presses downward on the food until it reaches a predetermined level above the lower platen, and stops there. It is lifted away when the food is cooked. Heated oil (maintained at substantially constant pressure by a weight controlled valve) is circulated through a first heat exchanger, which contacts, and transfers heat to, the lower platen, and through a second heat exchanger, which contacts, and transfers heat to, the upper platen. Each heat exchanger comprises three contiguous flat metal layers. The inner layer has a spiral-like passage for the oil to flow through, to heat an outer layer and maintain a substantially uniform temperature over its outer surface. Shape and dimensions for the passage may be determined in part by a finite element thermal conduction computer program. To minimize stresses in the inner plate and differences in thermal expansion among the layers, the passage may be cut out by a laser.

19 Claims, 7 Drawing Sheets

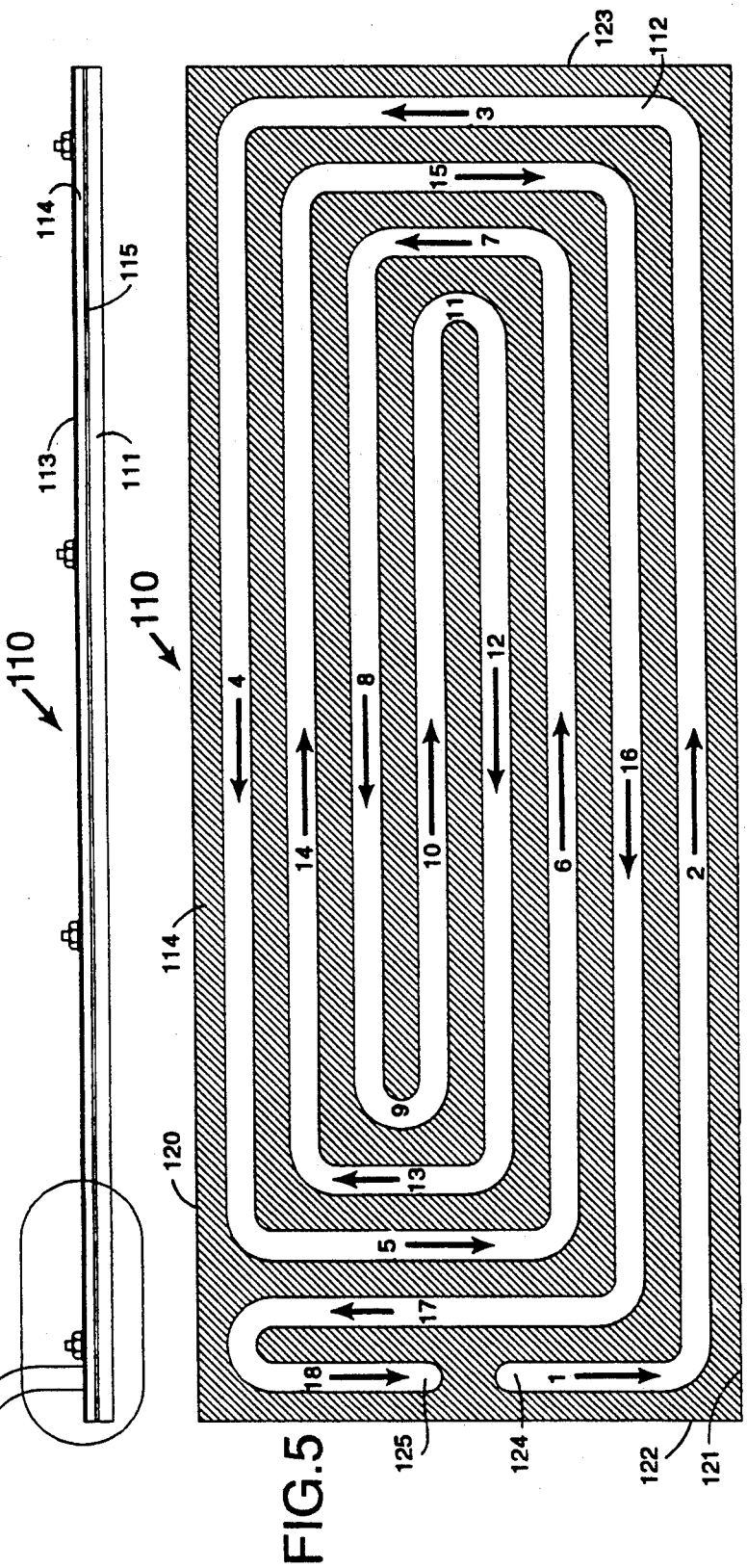

HEAT EXCHANGER

FIELD

This invention relates to apparatus for exchanging heat between a heat conductive surface and an adjacent region or object. It has to do more particularly with heat exchangers having features that are advantageous in gas-fired double-sided griddles for high-volume cooking as well as in other equipment where substantially uniform temperature is needed over a large surface.

The present invention is related to the subject matter disclosed in the following United States patent applications and patents, all of which are incorporated herein by reference:

Ser. No. 07/886,373, filed May 20, 1992, by Paul E. George, II, Richard E. Wendorf, and Bruce Taber, for Weight Controlled Valve; now U.S. Pat. No. 5,236,010 issued Aug. 17, 1993.

Ser. No. 07/886,509, filed May 20, 1992 by J. Douglas Dickson, for Positioning Mechanism; now United States Patent Ser. No. 07/886,372, filed May 20, 1992 by Paul E. George, II, Donald E. Fritzsche, J. Douglas Dickson, and John S. Barnhart, for High-Volume Cooking; now United States Patent The following disclosure includes, with slight revision, excerpts from the paper "Gas-Fired, Double-Sided Griddle for High-Volume Commercial Cooking", by Paul E. George, II, John D. Dickson, and Donald E. Fritzsche; presented May 21, 1991, at the 1991 International Appliance Technical Conference held at the University of Wisconsin-Madison; Madison, Wisconsin, U.S.A., May 21-22, and published in the Proceedings of the 42nd Annual International Appliance Technical Conference, pp. 51-65. The entire paper is incorporated herein by reference.

BACKGROUND

The patent applications, patents, and paper cited above disclose in more detail a typical gas-fired cooking apparatus and components thereof in which heat exchangers according to the present invention are employed to advantage.

Such a gas-fired double-sided griddle for commercial cooking typically includes a lower platen with a horizontal top cooking surface and an upper platen with a bottom cooking surface. A positioning mechanism moves the upper platen of each griddle into a horizontal position in contact with the food, permits the upper platen to press downward on the food until it reaches a predetermined level above the lower platen, stops the downward movement at that level, and lifts the upper platen away when the food is cooked. In order to achieve uniform doneness, all food on the griddle should be subject to a constant temperature cooking surface. The heat exchangers described here achieve temperature control by the intermittent flow of a heated fluid, typically a heat transfer oil.

A supply of oil is heated to desired temperatures. The heated oil (maintained at substantially constant pressure by a weight controlled valve) is circulated through a first heat exchanger, which contacts, and transfers heat to, the lower platen, and through a second heat exchanger, which contacts, and transfers heat to, the upper platen.

Each heat exchanger according to this invention typically comprises three contiguous flat metal layers. The exterior layers are flat sheets that provide covers for the inner layer. The inner layer has a passage for the oil to flow through, to heat an outer layer and maintain a substantially uniform temperature over its outer surface. The present invention comprises a particularly advantageous configuration for the oil flow passage. The shape and dimensions for the passage may be determined in part by finite element or finite difference thermal conduction computer programs. The passage may be cut out by a laser so as to minimize stresses in the inner plate and differences in thermal expansion among the layers.

Some prior art has addressed the issue of uniform heat exchanger temperature, for example, Friedman et al. U.S. Pat. No. 4,478,227, issued Oct. 23, 1984, for Heat Exchanger Having Uniform Surface Temperature and Improved Structural Strength. The present device is less expensive and appears to be superior to those in the prior art because of better local uniformity and better control of the edge heat losses.

DISCLOSURE

Typical apparatus according to the present invention, for exchanging heat between a heat conductive surface and an adjacent region or object, comprises a first cover plate at least an order of magnitude longer and wider than its thickness;

a middle plate substantially similar to the first cover plate, contiguous with, and joined to, the first cover plate over their coextensive surfaces;

a second cover plate substantially similar to and positioned opposite to the first cover plate, contiguous with, and joined to, the middle plate over their approximately rectangular coextensive surfaces;

the second cover plate having high heat conductivity;

the middle plate having a confined path therein for fluid to flow into, through, and out of;

the path for fluid being bounded on a first pair of opposite sides by inner surface portions of the cover plates, and on a second pair of opposite sides substantially perpendicular to the first pair by material in the middle plate;

the path for fluid being substantially longer than the perimeter of the coextensive surfaces of the plates, and comprising predominantly a double spiral substantially symmetrical about the centerline between one pair of parallel opposite sides of the coextensive surfaces of the plates and substantially symmetrical about the centerline between the other pair of parallel opposite sides of the coextensive surfaces of the plates, the midpoint of the double spiral lying on one said centerline.

Where one pair of opposite sides of the coextensive surfaces is longer than the other pair, the midpoint of the double spiral typically lies on the centerline between the longer sides.

DRAWINGS

FIG. 5 is a schematic sectional plan view of a typical heat exchanger according to the present invention.

FIG. 6 is a schematic edge view of the same heat exchanger.

FIG. 7 is an enlarged sectional view of the portion of heat exchanger that is encircled in FIG. 6.

CARRYING OUT THE INVENTION

The heat exchanger disclosed herein is intended as a part of a circulating fluid, typically oil, system that transfers heat from a fluid heater to an output device. The present heat exchanger may itself serve as the output device. It is a particularly advantageous device for applications such as cooking that require uniform temperatures and good temperature control.

Circulating Oil System

Figure 1:
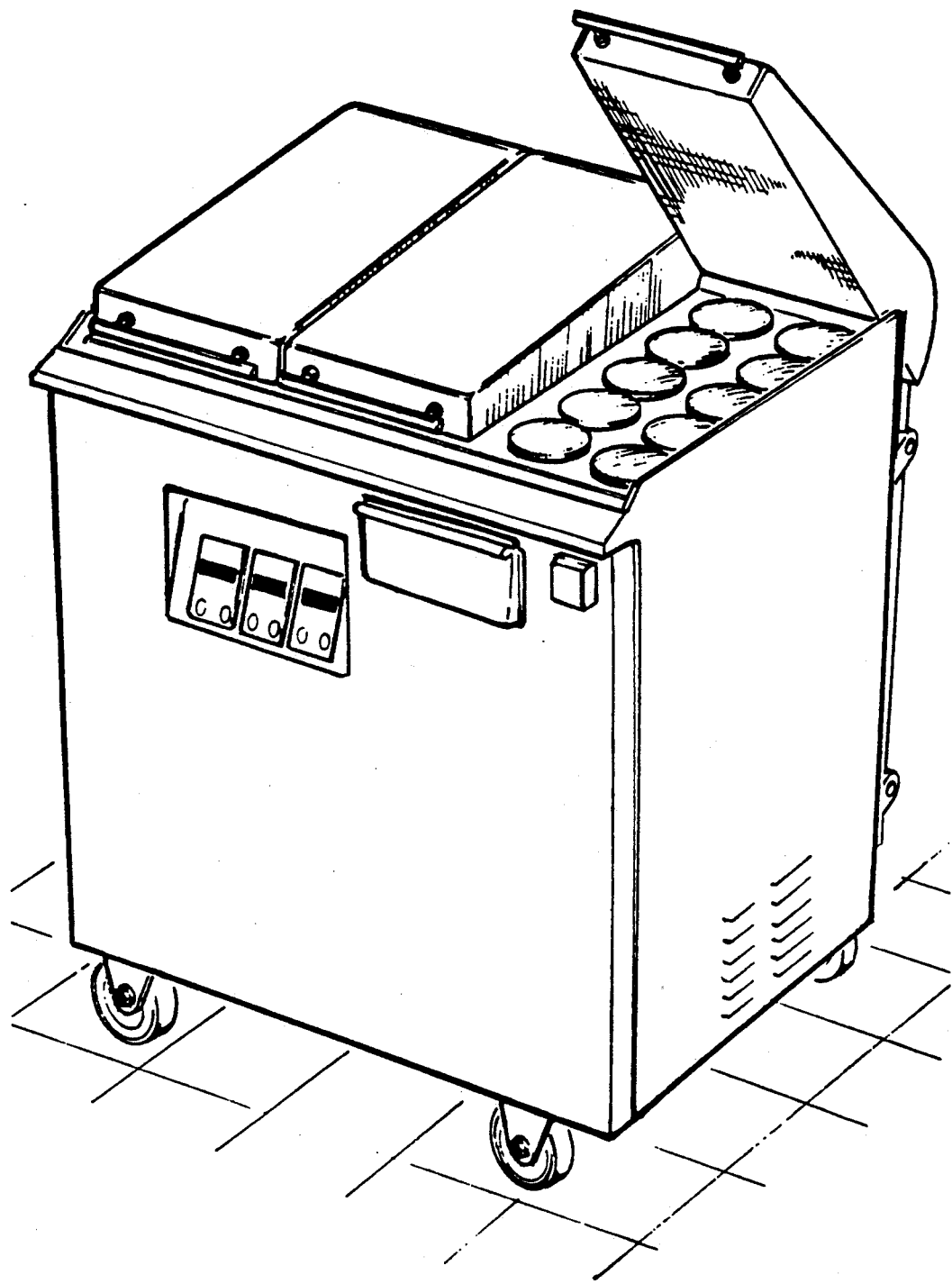
FIG. 1 is a perspective view of typical cooking apparatus according to the present invention.
Figure 2:
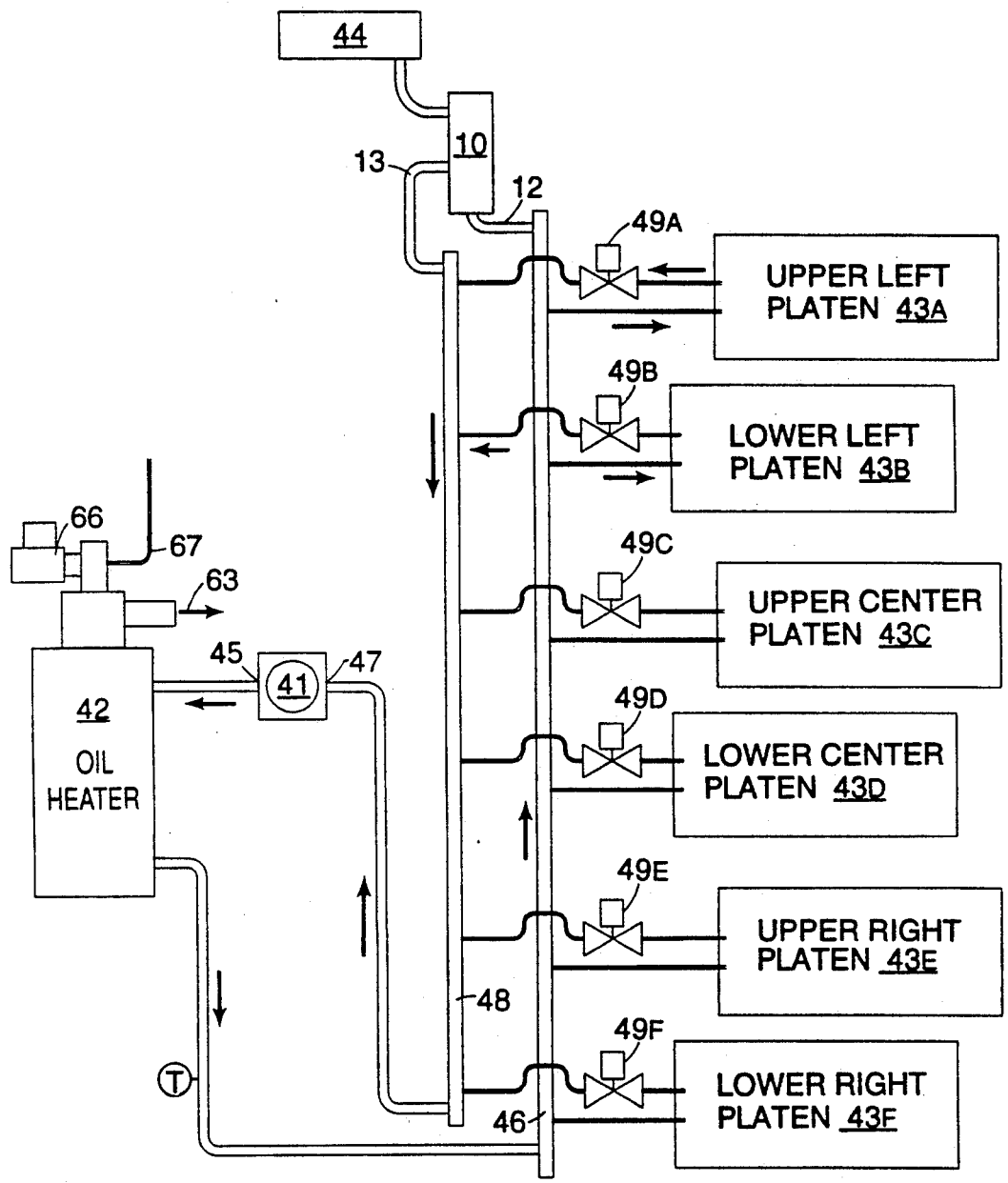
FIG. 2 is a schematic diagram showing a typical hot oil system for a gas-fired double-sided griddle for high-volume commercial cooking in which the heat exchanger in FIGS. 5-7 is especially useful.

A schematic diagram of a typical circulating oil system is shown in FIG. 2. The system comprises a pump 41, an oil heater 42, a supply manifold 46, a return manifold 48, a pressure control valve 10, several platens 43A-43F, and their associated control valves 49A-49F. Each platen 43 comprises a flat heat exchanger 110 and optionally a secondary plate 111 adjoined to the heat exchanger 110 by bolts or other convenient means as shown in FIGS. 6 and 7. The secondary plate or platen shoe 111 forms the cooking surface.

The success of the system depends largely on a ready supply of hot oil 23 that can be immediately circulated through a platen 43 when heat is needed. Maintaining a proper differential pressure between the supply and return manifolds 46, 48 and balancing the thermal inertia of the platens 43 with the amount of oil 23 introduced to the platen are also important. Surface temperature uniformity is achieved by an improved method of passing oil 23 through the platens 43 as disclosed herein.

An oil temperature controller turns the burner 62 on or off to maintain the oil temperature, leaving the heater 42 between, 420 and 450° F. Oil 23 is circulated continuously through the oil heater 42. In fact, the oil flow through the heater 42 is independent of the number of platens in service. The burner 62 is turned on when the oil leaving the heater 42 drops below 420° F. and off when it rises to 450° F. Since the heater 42 is designed to increase oil temperature about 15° F., all the oil 23 in the supply/return system is at least 435° F. when the burner turns off. With the burner 62 off, the temperature exiting the heater 42 equals the entering temperature, and the minimum oil temperature is 420° F. During idle operation (no platens calling for oil), the burner 62 runs less than five minutes every hour.

The pressure differential between the supply and return manifolds 46, 4B is maintained by a special deadweight valve 10.

A weight is supported by the pressure differential between the manifolds 46, 48 and rises or falls to increase or decrease flow as needed to maintain constant differential pressure. Because the design flow through the oil heater 42 is greater than the required flow with all platens 43 on, the weight 22 "floats" whenever the pump 41 is running and a magnetic switch on the weight ensures that adequate oil flow is available to the heater before the burner is allowed to operate.

Figure 8:
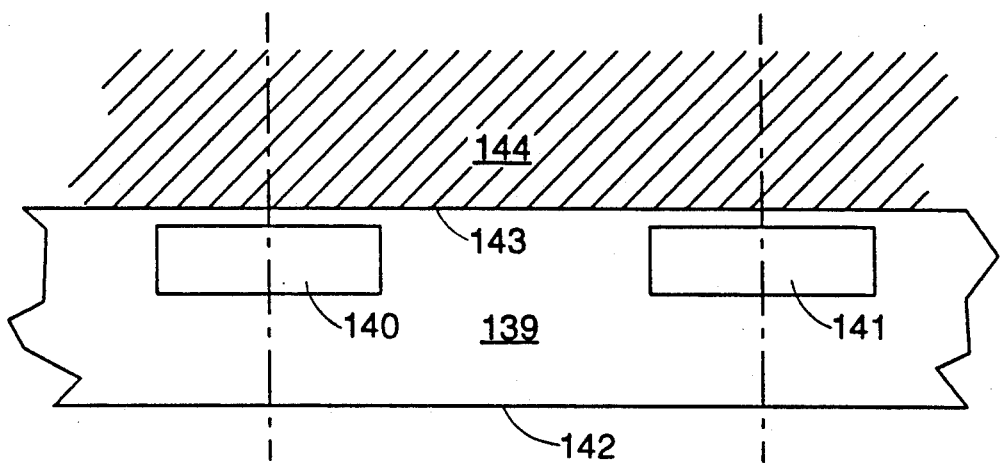
FIG. 8 is a schematic cross-sectional view of two adjacent channels in a heat exchanger as in FIGS. 5-7, illustrating typical methods of two-dimensional modeling to determine substantially optimal dimensions therein.

Because the pump 41 sees constant head (pressure), the flow through the oil heater 42 is constant. Frictional pressure drop introduces only minor variations in oil flow. The dead-weight valve 10 is located at the opposite end of the manifolds 46, 48 from the supply and return connection to eliminate dead spots. When configured as shown in FIG. 8, the entire supply manifold 46 is filled with hot oil 23 at all times.

Platen temperature is controlled by a solenoid valve 49 which is either open if the platen 43 is below set point or closed if the platen 43 is above set point. A suitable dead band (typically about 5° F.) is included in the controller. When the solenoid valve 49 opens, hot oil 23 flows through the platen 43 and heats the cooking surface. When the valve 49 closes, hot oil 23 is trapped inside the platen 43. As the oil cools, the platen temperature rises until the metal and oil equilibrate.

The platen 43 is designed so that a full charge of oil at 450° F. will not cause the platen to heat more than about 15° F. above set point even under low-temperature conditions. For example, if the control set point is 250° F., and the platen temperature drops below 247.5° F., the solenoid valve 49 opens until the platen temperature rises to 252.5° F. and then closes. The heat capacity of the platen 43 is over 15 times that of the oil 23, so the equilibrium temperature without heat loss is less than 265° F. When cooking, the temperature overshoot is actually lowered by the heat load on the platen 43. As platen temperature is increased to 350° F. the amount of overshoot drops since the oil 23 must cool less before matching the platen temperature. Heat loss from the platen is also higher so that overshoot is almost nonexistent at 350° F.

The minimum mass of the platens 43 is defined by temperature overshoot; the maximum is not constrained. However, quickest response is obtained by platens with the minimum mass. Fortunately the response time of the platens is more dependent on surface contact between the oil 23 and platen 43 than on the total mass of oil in the system. One key to successful operation of the griddle is to maximize oil side heat transfer area and minimize oil inventory in the platen.

Upper Platen Positioning System

Another important aspect of the gas-fired, double-sided griddle is a means of conveniently positioning an upper cooking surface in contact with the product. Various methods and apparatus are available. The most desirable are disclosed in the patent application, patents, and paper cited above. The heat exchanger disclosed herein is particularly beneficial in double-sided griddling because it conveniently and inexpensively provides the needed uniformity of temperatures.

Platens

Each platen assembly typically includes a heat exchanger 110 with a removable platen shoe 111 mechanically attached to it, as shown in FIGS. 6 and 7. Typically a layer of heat transfer grease improves contact between the platen shoe 111 and the heat exchanger 110 over their contiguous surfaces, as indicated at 116 in FIG. 7. The platen shoe 111 may be coated with a nonstick coating if desired.

Surface, Temperature, and Uniformity

Figure 3:
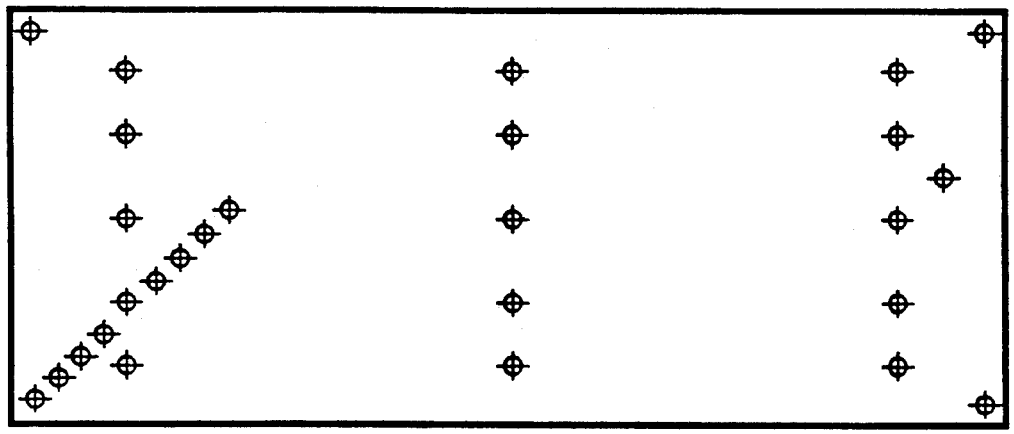
FIG. 3 is a schematic plan view of a heating platen showing the locations of thermocouples used in testing the uniformity of temperature therein.

FIG. 3 shows the positions of thermocouples welded on an upper platen during a temperature uniformity test. Excluding the corners, the thermocouple temperature range (maximum minus minimum) was 5° F. at any specific time. Incorporating the 5 degree dead band in the controller, the temperature range during steady state operation is 10° F. These highly uniform temperatures are achieved by the unique design of the present platen assembly.

Start-Up and Recovery

Figure 4:
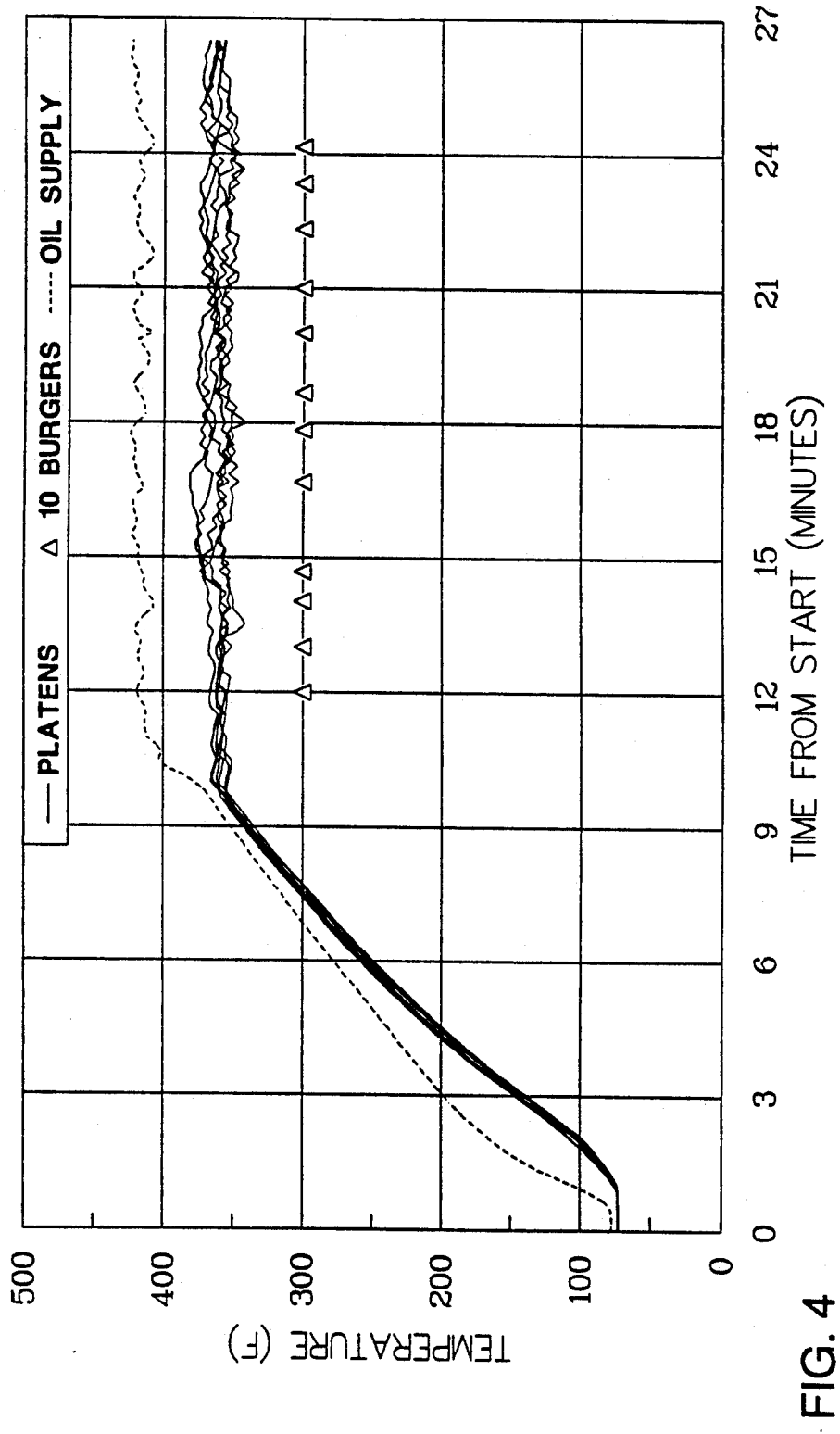
FIG. 4 is a graph of measured cooking surface and oil temperatures as functions of the time from starting to heat a griddle in the cooking apparatus.

FIG. 4 shows a temperature trace for a double sided griddle, 3 feet wide, as it warms from a cold condition to 360° F. Each diamond on the 300 degree line represents a load of ten hamburgers applied to a one foot wide section of the griddle. Hamburgers were loaded sequentially from the left section to the right. The griddle achieved cooking temperature in 12 minutes, and 120 hamburgers were cooked in 13 minutes. A skilled operator could have done better. As expected, temperature was less uniform during cooking than during testing because frozen hamburgers were placed on the griddle. However, there is no detectable temperature drop during cooking. A 30 degree sag did occur near the 27-minute mark when a soaking wet bath towel was placed on the griddle to begin cleaning.

Zone Separation

A pancake was placed to overlap two zones during cooking. The zone on the left was set for 265° F. and the zone on the right for 400° F. Two points were apparent from this qualitative test: zone separation is excellent since the 400° to 275° F. transition was observed to take place in less than one inch, and each section of the pancake was uniformly browned, showing local qualitative uniformity that confirms the quantitative data outlined above. Zone separation is facilitated by the design disclosed herein.

Cooking Performance

The griddle has been tested on hamburgers (double-sided), pancakes (double and single-sided), bacon (double-sided), and eggs (double and single-sided). Sunny side up eggs were prepared with the upper platen latched, but not touching the eggs. The result was a firmly cooked white and a warm, but uncooked, yolk. Performance was excellent on all foods tested. Upper to lower platen parallelism is crucial for double-sided cooking uniformity.

The gas-fired double-sided griddle meets or exceeds all of the engineering objectives required for a successful commercial appliance. Cooking performance appears to be better than in other known double-sided griddles. Surface temperature and zone separation are outstanding. The improved performance is attributable largely to the use of a hot oil system to transfer heat to the cooking surfaces and the incorporation of counterbalanced parallel motion linkages for the upper platens.

Summary

The gas-fired, double-sided griddle system includes a lower cooking surface, at least one upper cooking surface, means for positioning the upper cooking surface, a circulating oil system, and other minor components necessary for control and safety. A novel feature of the griddle is the use of hot oil to transfer heat from a gas flame to the cooking surfaces. Further, the details of the oil system and the means by which heat is transferred from the oil to the cooking surface are particularly useful in achieving good cooking performance.

The circulating hot oil system coupled with the convoluted spiral heat exchanger/platen design (FIG. 5) enables very uniform cooking surface temperature, a low mass platen (therefore quick response) and excellent separation between cooking zones on the lower surface. These features depend on having a supply of oil that is hot and available for circulation to the platen at any time.

The weight controlled valve 10 and continuously recirculating oil loop 41-49 in FIG. 2 provide a constant pressure differential between the supply and return manifolds 46, 48 and insure that hot oil 23 is always available in the supply manifold 46. Thus control of cooking surface temperature is achieved by the simple expedient of turning on or off a valve 49 to allow or stop the flow of oil to the platen 43. The control valve 49 for each platen 43 is beneficially located downstream of the platen 43 where oil temperatures have been cooled and are therefore less severe on the valve 49.

Heat Exchanger

The uniform surface temperature is primarily a result of the method of circulating oil 23 in the convoluted spiral pattern heat exchanger 110 of FIGS. 5-7. The convoluted heat transfer channel 112 allows platen surface temperatures of about ±5° F. to be achieved even though the oil changes temperature by as much as 40° F. as it flows through the platen.

In addition to the convoluted spiral 112, a typical design includes an engineered balance between the mass of steel in the platen 43 and the total mass of oil 23 contained within the platen. This is coupled with the use of a low temperature difference, high convection coefficient configuration for the platens. In other words, the flow passage 112 is designed to have a high oil velocity and high heat transfer surface area (rectangular shape) but a minimum of contained oil 23 so that when oil flow is stopped the surface temperature does not rise excessively due to the energy in the oil 23.

The high velocity permits sufficient heat transfer without requiring a high oil temperature, which also limits the maximum rise in platen temperature when oil flow is stopped. The inlet oil temperature need only be about 40° F. above the platen temperature to achieve adequate heat transfer. For practical control it is convenient to have the entering oil 23 at about 420° to 450° F. for cooking at temperatures up to about 400° F. A beneficial modification is to have the maximum oil temperature adjusted to about 45° F. over the hottest platen setpoint. This is possible using an integrated electronic control system.

Another attribute designed into the griddle to achieve uniform surface temperature is a minimum conduction path between each cooking section and its neighbors, between each section and the griddle frame and splash guard. A thin griddle plate 111 improves zone separation and minimizes edge heat loss; but may not even out the temperature between the channels on the heat exchanger. Eight channels per 12 inch wide section, as in FIG. 5, coupled with a 3/16 inch thick griddle plate has been found to provide a good balance between these two competing requirements and provide sufficient strength as well.

As discussed above, the oil temperature is only slightly higher than the platen temperature. If one or two hamburgers are cooked on the front of a platen, the heat load in that area requires that heat be supplied to the platen. For electric or conventional gas, this can result in severe overheating of the unused portions of the griddle because heat is added to those areas even when it is not needed. Since the maximum oil temperature is about 450° F., the maximum temperature to which unheated portions of the griddle can be heated is less than 450° F., which is not unnecessarily hazardous to personnel, food products, or surface coatings. The surface temperature uniformity design aspect also relates to this attribute.

Cooking zone separation is related to the conduction path between zones as discussed above. Zone separation is an important attribute for griddle flexibility, and the level of zone separation we have achieved has been impressive to people in the food service industry.

The griddle should warm up from cold rapidly, should recognize the presence of a frozen hamburger quickly, should avoid a sag in temperature with a heavy food cooking load, and should recover from a heavy load as soon as possible without overshooting the set temperature. The circulating hot oil system of FIG. 2 is particularly good at quick recovery and minimizing sag, because we maintain a constantly circulating reserve of hot oil which can be introduced to the platen quickly. Further, the thin griddle plate permits sensing temperature only slightly below the surface so that the presence of food is detected early. Finally, the low mass of steel in the system allows the griddle to heat up from cold rapidly. It also permits a cooldown on change to a lower setpoint temperature more rapidly than with other griddles.

Because the combustion process is isolated from the heating surfaces by the hot oil, it is possible to design a high efficiency heater specifically for the oil. The heater design includes a relatively high oil velocity to minimize surface temperatures and maximize oil life, a high gas side surface area to extract energy from the combustion products and, in our preferred design, some preheating of the incoming air to conserve energy and improve efficiency. The burner is a fully premixed power burner that is well matched to the heater coiled tubing. Configurations using premixed burners and rapid flue gas temperature quench by finned tubes achieve less than 30 ppm NOx as compared to 60 to 100 for a conventional griddle.

A particular pattern of fluid flow through a heat exchanger has been found beneficial in achieving very uniform surface temperatures on the heat exchanger. Possible uses for this device include cooking, especially of temperature sensitive foods, preparation of chemical compounds and polymers sensitive to temperature variations, the growing of crystals under controlled conditions, and various other applications requiring substantially uniform temperature over the heat exchanger surface.

In a typical heat exchanger, fluid at a temperature presumably greater than that desired for the heat exchanger surface is brought into the heat exchanger, passes through a path provided in the exchanger and transfers heat to the exchanger and to any load in contact with the heat exchanger. As heat is transferred from the fluid, its temperature drops so that as the fluid leaves the exchanger its temperature may be many degrees different than when it entered. In all heat exchangers with which we are familiar, this causes a change in the temperature of the heat exchanger from inlet to outlet.

The success of the heat exchanger is dependent on a slightly modified convoluted spiral pattern for the fluid flow path. The path is shown schematically in FIG. 5. If the rectangular shape is mentally adjusted to a roughly circular configuration, it becomes clear that there are two parallel spirals, one traversing in from the outside toward the center and adjoining a second that traverses from inside to out. Provisions are made for connections at the end of the spirals.

FIG. 5 shows the direction of fluid flow in each channel. It is readily seen that fluid flow direction alternates between right and left (as well as up and down) from each channel to the next one, and that the coolest fluid leaving is adjacent to the hottest fluid entering. The next to coolest fluid (just behind the fluid leaving) is adjacent to the next to hottest fluid (just ahead of the fluid entering), and so on in the same manner (that is gradually warmer "leaving" fluid is adjacent to gradually cooler "entering" fluid) toward the midpoint in the spiral; as each adjacent fluid temperature approaches an average temperature, one from above the average and the other from below. The hot fluid is located at the outside so that it may compensate for higher heat loss on the edges.

A point on the surface of the heat exchanger between channels 2 and 16 reflects the temperatures of channels 2 and 16 and perhaps others. Since channel 2 contains some of the hottest fluid and channel 16 contains some of the coolest, the chosen point reflects an average between the two.

For the next higher pair of channels, 6 and 16, the mean temperature is between those in the cooler channel 16 and the hotter channel 6. Channel 6 is cooler than channel 2, so that a point between channels 16 and 6 might be expected to be cooler than a point between channels 2 and 6. However, all points on the surface are affected by more than just the two adjacent channels. Further, the temperature difference between channels 2 and 6 is much less than the temperature difference between channels 2 and 16 so that points near channel 16 are influenced by two relatively hot channels and one cooler channel.

Similar analysis can be applied to the remaining sections of the heat exchanger. We have found that with proper design of the heat exchanger the effect of the double spiral pattern is to provide surface temperature uniformity better than is achievable with other arrangements of fluid flow. We recognize that phase change fluids, such as condensing steam, can provide a more nearly uniform temperature. However, in many applications the use of circulated fluid is beneficial in that pressure may be kept low and temperature is more easily varied.

An important aspect of the design is to provide a plate that is thick enough to even out temperatures between channels yet maintain significant separation between channels. The design shown in FIG. 5, with channels about 0.625 inch wide, and with land areas about 0.750 inch wide separating the channels, is satisfactory for fluids entering at about 450° F. and experiencing a temperature drop of about 30 to 40 degrees between the inlet and the outlet. In this case, temperatures on the platen have been measured to be within ±5° F. over the entire surface with the exception of the corners, which are at a lower temperature (typically about 10 to 15 degrees lower).

The design of the heat exchanger may be carried out by conventional mechanical engineering techniques for heat conduction and convection. Various manual and computer methods are available and have been applied in heat transfer analysis. The convoluted spiral path of the present invention can make a conventional analysis difficult. We have found, however, that analysis of a simple two-dimensional model is sufficient to insure substantially uniform surface temperatures over the platen when coupled with a simple crosstalk model for the entire channel. Crosstalk between channels is important because excessive crosstalk can lead to very non-uniform temperatures in this design. Specifically, the center of the platen may be much cooler than the edges if heat transfer between channels is too great. Typical design methods are discussed further below.

FIG. 8 is a cross-sectional view of two channels within the heat exchanger. The temperature distribution on the surface of the plate can be determined using readily available heat conduction computer programs such as TRUMP, a computer program for transient and steady-state temperature distributions in multidimensional systems. UCRL-14754, Rev. 3, available from Lawrence Livermore Laboratory, University of California, Livermore Calif. 94550.

A conservative design approach is to define one channel as being at the fluid inlet temperature and the other at the expected outlet temperature for the design heat load on the heat exchanger. The heat transfer coefficient in the fluid passage may be estimated by standard correlations found in college texts, for example, Incropera, F. P. and DeWitt, D. P. (1981) *Fundamentals of Heat Transfer*, John Wiley and Sons, New York.

The heat transfer coefficient on the surface and the free stream temperature are arbitrarily adjusted to give the design heat flux for the desired average surface temperature. With these boundary conditions set, the surface temperature distribution, the heat flux to the surface, and the heat flux between the channels may be calculated. If the surface temperature above the middle of the cold channel differs more than desired from the surface temperature above the hot channel, the cover plate must be made thicker or the channels moved closer together. Generally the former is preferred.

If this or another design approach shows the surface uniformity to be satisfactory, the crosstalk between channels must be checked. Some crosstalk, the transfer of heat from one channel to the next, is inevitable with this design. Only if crosstalk results in excessive cooling near the center of the plate is there a problem.

Figure 9:
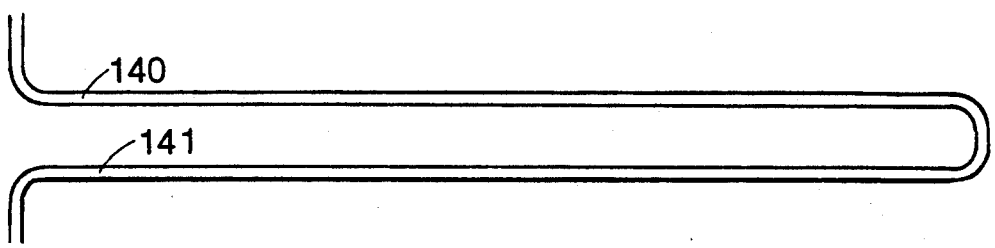
FIG. 9 is a schematic drawing generically representing the channel in a heat exchanger as in FIGS. 5-7, and illustrating a simplified model to calculate the temperatures along the length of the channel.
Figure 9A:
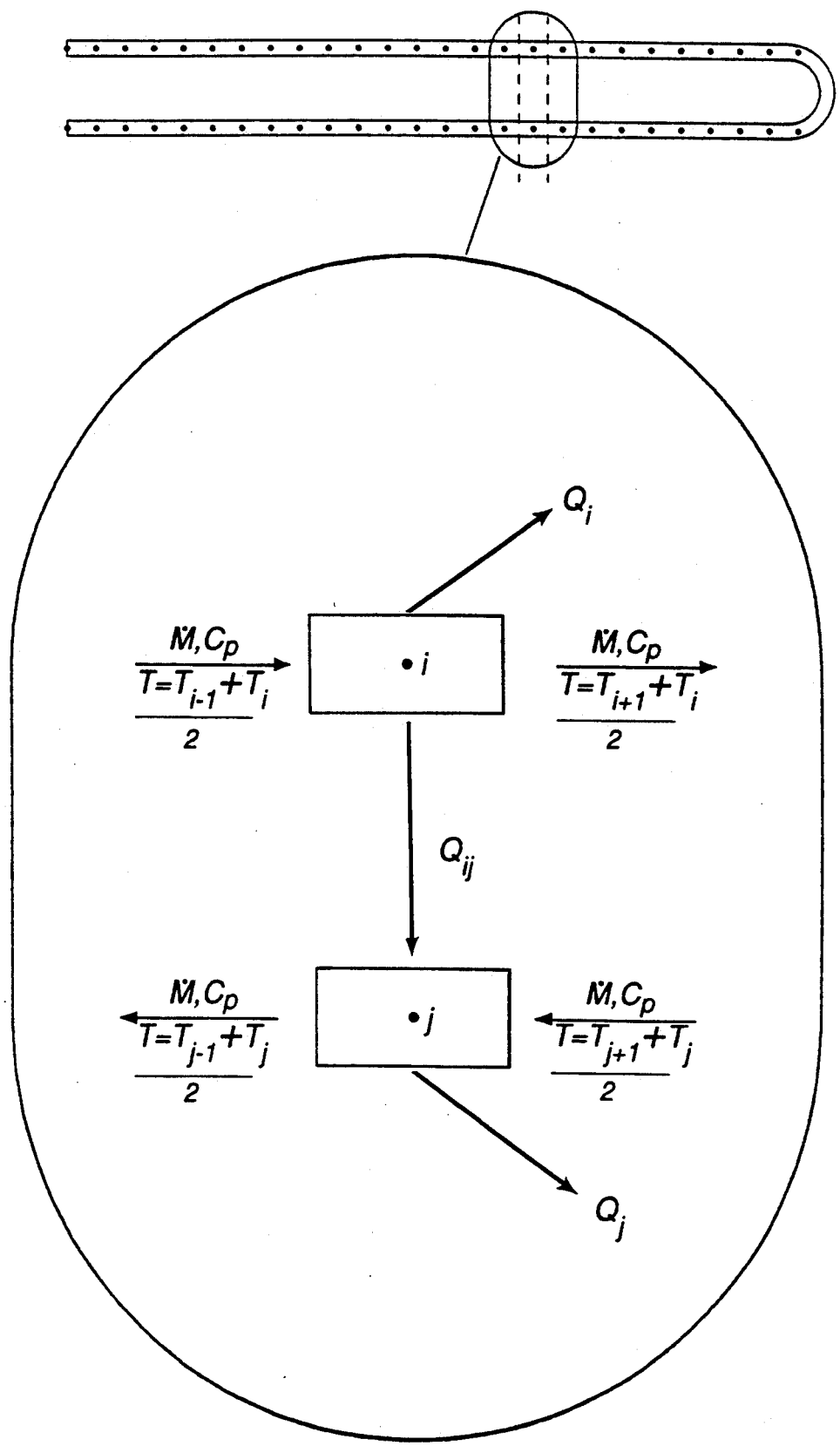
FIG. 9a is a schematic drawing similar to FIG. 9 and including an enlargement of a pair of discrete sections in the model, with labels showing the locations of quantities in the equations used in the analysis as described herein.
Figure 10:
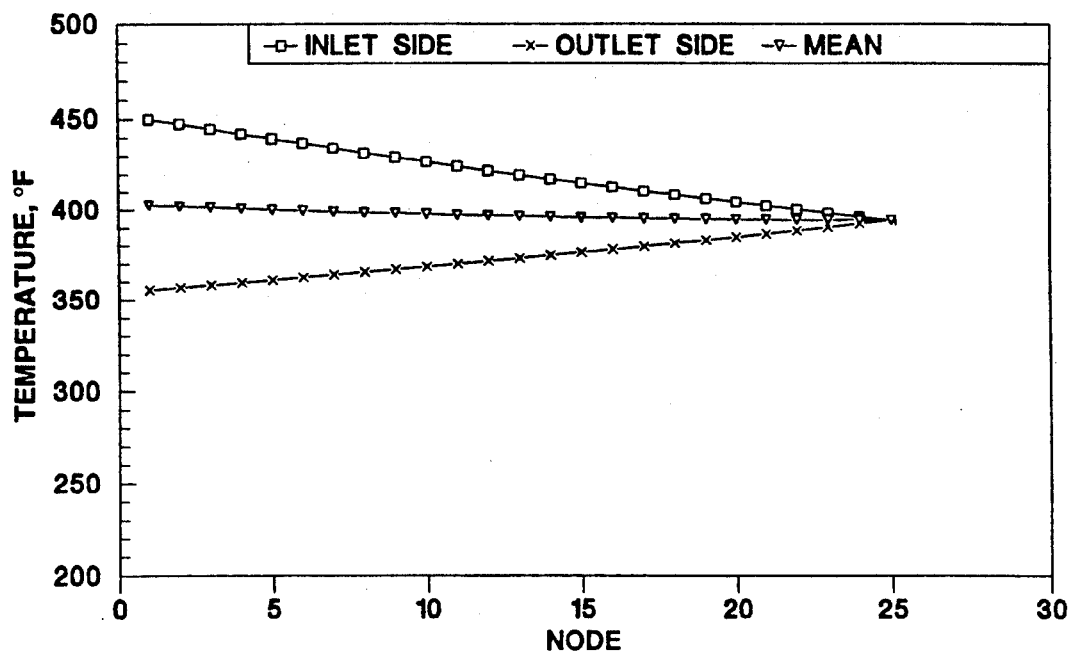
FIG. 10 is a graph of temperature versus length at successive points along the inlet half of the channel and at adjacent points along the outlet half of the channel for a well-designed heat exchanger according to the present invention.
Figure 11:
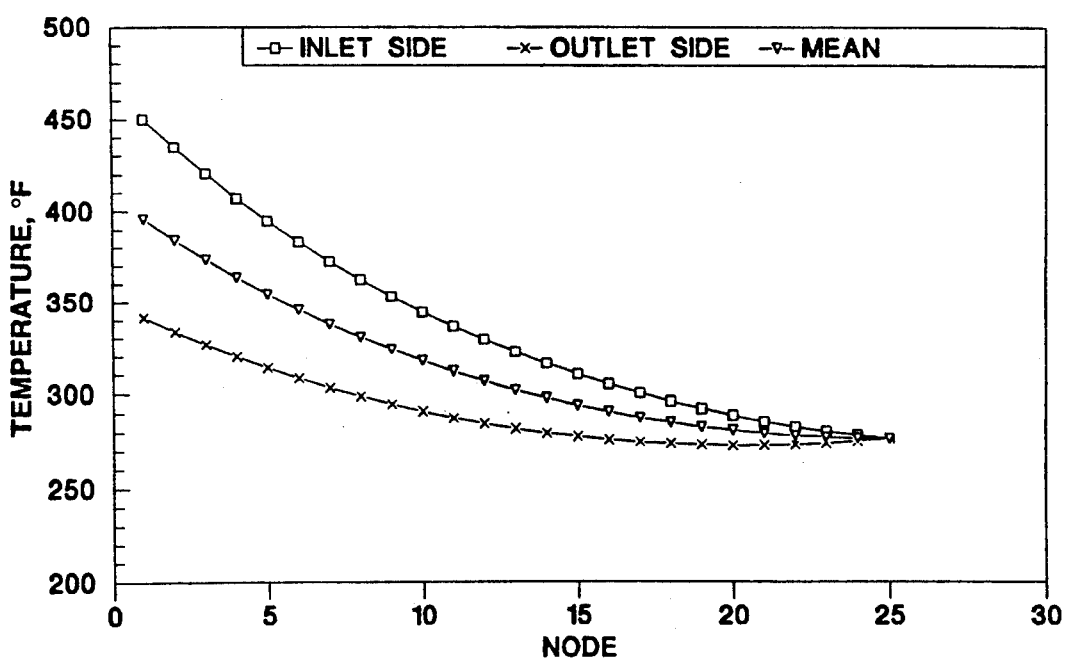
FIG. 11 is a graph similar to FIG. 10 for a heat exchanger of the same general type, poorly designed.

A simple method of evaluating the design for crosstalk is to again consider only one pair of channels. The pair of channels are allowed to exchange energy between themselves and with the environment. The relative exchange rates are taken from the two dimensional model above. FIGS. 9 and 9a illustrates a discretized method that can easily be programmed using a spreadsheet type program capable of performing iterations, such as Supercalc 5, available from Computer Associates International, 1240 McKay Drive, San Jose Calif. 95131. FIG. 10 is a graph of the output of such a model where crosstalk is a minimum and the design is satisfactory. FIG. 11 is a similar graph for channels spaced too closely or excessive channel length.

The two-dimensional model provides an estimate of the rate of heat transfer between the channels and the rate of heat transfer to the load. These values can be incorporated into a simplified model to assess the temperatures along the full length of the channel allowing for crosstalk between only the inlet and outlet channels as shown in FIG. 9.

FIG. 9 shows a U-bend heat exchanger with fluid entering the top tube and exiting the bottom. Energy may be exchanged between the upper and lower tubes and with the surroundings. This simplified schematic has been found useful for analyzing the impact of heat exchange between channels of a double spiral type heat exchanger. The two tubes are divided into discrete sections. An arbitrary pair of sections is enlarged in FIG. 9a to illustrate the method of analysis. For this illustration, the nodes are called i for the upper and j for the lower section and are located at the center of the sections. Persons familiar with heat transfer analysis will recognize that other methods are also appropriate for the analysis.

The nodes are numbered from left to right so that the node to the left of i is i−1 and the node to the right of j is j+1. Because a steady flow of incompressible fluid is assumed, the mass flow through each face is constant. Performing an energy balance on node i, we have $$-Q_{ij} + MC_p \frac{(T_{i-1} + T_i)}{2} - Q_i - MC_p \frac{(T_{i+1} + T_i)}{2} = 0$$

For node j we have $$+Q_{ij} + MC_p \frac{(T_{j-1} + T_j)}{2} - Q_j - MC_p \frac{(T_{j-1} + T_j)}{2} = 0$$

where
$T_j$ = temperature of node i
$M$ = mass flow
$C_p$ = specific heat
$Q_i, Q_j$ = heat transferred to surroundings/load
$Q_{ij}$ = heat transferred between channels $Q_{ij}$ is defined by $(UA)_{ij}(T_i - T_j)$ where $(UA)_{ij}$ is obtained by estimating the heat transfer resistance offered by convection to the wall for both channels and the conduction through the load area. This value may be derived from textbook heat transfer analysis as in, for example, Chapman, Alan J. (1984) *Heat Transfer*, Macmillan Publishing Company, New York. Or it may be obtained more accurately from the two dimensional analysis above.

Likewise, $Q_i$ and $Q_j$ are given by
$Q_i = (UA)_i(T_i - T_{amb})$ and $Q_j = (UA)_j(T_j - T_{amb})$ where $T_{amb}$ is the temperature of the load seen by the heat exchanger.

Substituting these expressions into equations 1 and 2 allows derivation of $$T_i = \frac{2C_{ij}T_j + 2C_iT_{amb} + T_{i-1} - T_{i+1}}{(2C_{ij} + 2C_i)}$$

and $$T_j = \frac{2C_iT_{amb} - 2C_{ij}T_i + T_{j+1} - T_{j-1}}{(2C_{ij} + 2C_i)}$$

where $$C_{ij} = \frac{(UA)_{ij}}{MC_p}, \quad C_i = \frac{(UA)_i}{MC_p}, \quad C_j = \frac{(UA)_j}{MC_p}$$

These formulas are applied to each node and the temperatures obtained by iterative solutions. The boundary conditions are:

T at upper node 1 = T at oil inlet
T at upper node n = T at lower node n
n = last node at U-bend.

FIG. 10 is a plot of temperatures obtained with a properly designed heat exchanger. Clearly the temperature between the two channels is the average between the temperatures on each side and is approximately constant for the entire length.

FIG. 11 is a similar plot of temperatures in a heat exchanger where the channel is too long, or where the crosstalk between channels is allowed to be too great by not providing a wide enough land area between channels. This design would result in a cool center on the platen because the fluid leaving picks up energy from the entering fluid, causing the entering fluid to cool off too fast.

The design presented here, having eight passes in a heat exchanger 11.5 inches wide and 28.5 inches long, with 0.75-inch separation between channels and a plate at least about 0.3-inch thick on the side of the heat exchanger that is to be maintained at a uniform temperature, has been shown to be satisfactory. By proper application of the double spiral technique and engineering analysis described above, other configurations can be devised that achieve equal or superior results.

Summary

A particular pattern of fluid flow, a convoluted spiral, provides nearly uniform temperatures on the surface of a heat exchanger. Fluid (presumably hot, although cold fluid can be used for cooling applications) enters at a point near the edge of the exchanger. A channel guides the fluid in a roughly spiral path to near the center of the heat exchanger surface. The fluid path turns back on itself at the center and returns to the original edge of the exchanger in a spiral path parallel with the incoming path. Thus, a section through the exchanger shows alternating flow directions in adjacent flow channels.

The optimal number of revolutions of the spiral depends on the size of the heat exchanger. The more revolutions in the spiral, the more nearly uniform the temperature, but the higher the pressure drop through the system and the lower the flow. The currently preferred embodiment for a heating surface 12 inches wide by 28.5 inches long includes eight passes as shown in FIG. 5.

For the most nearly uniform temperatures, the thickness of the metal cover plate over the fluid passages should be at least about one-third of the separation distance between passages. A single thin cover plate may be used in conjunction with a thicker plate which is bolted or otherwise attached to the heat exchanger. The separation distance between channels should be not greater than about twice the channel width, and typically is not more than about the channel width. Very thin separation distances should not be used as heat transfer between channels might be excessive. The minimum separation depends on the materials of construction.

A particular design can be optimized by means of available conductive heat transfer programs, such as TRUMP (mentioned above), when the maximum and minimum desired heat exchange are defined. A successful heat exchanger may be designed by using a two dimensional finite element thermal conduction computer program to calculate surface temperatures under a variety of heat loss conditions. The cover plate thickness and channel separation distance are adjusted until a satisfactory uniform temperature is obtained on the surface.

In applying a two dimensional model, the maximum temperature difference between channels and the maximum heat loss are considered. Heat transfer coefficients on the interior surface are estimated by conventional correlations. The heat transfer on the exterior may be applied as a heat flux boundary condition, or it may be defined using a heat transfer coefficient and "free stream" temperature.

Successful heat exchangers can be designed in this manner without resorting to three dimensional modeling. In the absence of computer modeling, the relative channel width, channel separation, and cover plate thickness shown in FIGS. 5-7 can provide guidance.

Maintaining flatness and a leak tight exchanger requires substantial care. In fabricating the heat exchanger, typically a single laser cut "labyrinth" plate is placed between two identical cover sheets. The assembly is then furnace brazed using copper or other appropriate brazing filler metal. This technique provides consistently flat exchangers since the laser cutting process introduces only very low stresses in the labyrinth plate. Other methods of fabrication, such as machining or stamping the labyrinth plate, also may be used.

Recapitulation

To summarize in the format and terminology of the claims, typical apparatus 110 according to this invention, for exchanging heat between a heat conductive surface and an adjacent region or object, comprises a first cover plate 113 at least an order of magnitude longer and wider than its thickness;

a middle plate 114 substantially similar to the first cover plate 113, contiguous with, and joined to, the first cover plate 113 over their coextensive surfaces;

a second cover plate 115 substantially similar to and positioned opposite to the first cover plate 113, contiguous with, and joined to, the middle plate 114 over their approximately rectangular coextensive surfaces;

the second cover plate 115 having high heat conductivity;

the middle plate 114 having a confined path 112 therein for fluid to flow into, through, and out of;

the path 112 for fluid being bounded on a first pair of opposite sides by inner surface portions of the cover plates 113, 115, and on a second pair of opposite sides substantially perpendicular to the first pair by material in the middle plate 114;

the path 112 for fluid being substantially longer than the perimeter of the coextensive surfaces of the plates, and comprising predominantly a double spiral substantially symmetrical about the centerline between one pair of parallel opposite sides 120, 121 of the coextensive surfaces of the plates and substantially symmetrical about the centerline between the other pair of parallel opposite sides 122, 123 of the coextensive surfaces of the plates, the midpoint of the double spiral lying on one said centerline.

Where one pair of opposite sides 120, 121 of the coextensive surfaces is longer than the other pair 122, 123, and the midpoint of the double spiral typically lies on the centerline between the longer sides 120, 121.

Typically the path 112 for fluid begins at an entering point 124 near a side 122 of the coextensive surfaces; guides the fluid in a roughly spiral inward course (1-10) therefrom, proceeding first (1,2,3,4) near, and approximately parallel to, the perimeter of the coextensive surfaces; then (5,6,7,8) inward from, and approximately parallel to, the first portion of the path 112; and so on (9,10) in the same manner to a midpoint 11 near the center of the coextensive surfaces; from which midpoint 11 the path 112 continues in a roughly spiral outward course (12-18) approximately parallel to, and midway between, the adjacent portions of the inward course (1-10) to an exiting point 125 in the vicinity of the entering point 124; so that the direction in which the fluid flows in each portion of the path 112 is opposite to that in the portions adjacent thereto, the coolest fluid leaving (16-18) is adjacent to the hottest fluid entering (1-2), the next to coolest fluid (14-15) (just behind the fluid leaving) is adjacent to the next to hottest fluid (3-4) (just ahead of the fluid entering), and so on in the same manner (with gradually warmer leaving fluid adjacent to gradually cooler entering fluid) toward the midpoint 11, where the fluid entering (10) continues on as fluid leaving (12).

The thickness of the second cover plate 115 typically is about one-third to three-fourths of the separation distance between adjacent portions of the path 112 for fluid.

In typical embodiments of the apparatus, the thickness of the second cover plate 115 is about one-fifth to one-third of the thickness of the center plate 114, and the apparatus comprises also an additional plate 111 in intimate contact with the outer surface of the second cover plate 115 over the region thereof opposite the region that is joined with the middle plate 114, the additional plate 111 being thicker than the second cover plate 115, and the total thickness of the second cover plate 115 plus the additional plate 111 is about one-fourth to three-fourths of the separation distance between adjacent portions of the path 112 for fluid.

Other typical features may include:

A. The separation distance between adjacent portions of the path 112 for fluid is equal to about one-half to four-thirds of the width of the path 112.

B. Each cover plate 113, 115 is thinner than the middle plate 114.

C. Each plate 113, 114, 115 is metallic.

D. The surfaces of the plates 113, 114, 115 define a smooth curve in every direction.

E. The plates 113, 114, 115 are flat.

F. Each plate 113, 114, 115 has high heat conductivity.

G. Each plate 113, 114, 115 has substantially the same temperature coefficient of expansion.

H. Each cover plate 113, 115 is made of the same material.

I. The middle plate 114 and one of the cover plates 113 or 115 may consist of a single piece of metal.

For heating a platen in cooking apparatus, typically oil is conveyed through the path 112 for fluid at a velocity of about 1 to 10 feet per second, at a temperature upon entering the path of about 20 to 50 degrees Fahrenheit above the desired cooking temperature (typically at a temperature upon entering the path of about 420 to 450 degrees Fahrenheit).

A typical method of making apparatus 110 according to the present invention comprises cutting away from a first substantially flat sheet of metallic material 114 the region thereof defining the double spiral path 112 for fluid, to form the middle plate 114; placing a first surface of the middle plate 114 in contact thereover with a surface of a second substantially flat sheet of metallic material 113 substantially congruent thereto; placing the opposite surface of the middle plate 114 in contact thereover with a surface of a third substantially flat sheet of metallic material 115 substantially congruent thereto; and adhering each pair of contacting surfaces in such manner as to maintain intimate contact throughout their contiguous surfaces over a range of temperatures extending well below the lowest temperatures reasonably expected to be encountered and well above the highest temperatures reasonably expected to be encountered by the apparatus.

Typically each sheet 113, 114, 115 comprises steel, and the adhering step comprises brazing in a furnace or pressing the surfaces together against a coating of adhesive material. The cutting away of material from the first sheet to form the middle plate 114 typically is done by a laser.

Another typical method of making apparatus 110 according to the invention comprises removing from a first substantially flat sheet of metallic material (which is to become, in a single piece, the middle plate 114 and one of the cover plates 113 or 115) the region thereof defining the double spiral path 112 for fluid in the middle plate layer 114 of the piece; placing the surface of the middle plate layer 114 in contact thereover with a surface of a second substantially flat sheet of metallic material 115 or 113 substantially congruent thereto; and adhering the pair of contacting surfaces in such a manner as to maintain intimate contact throughout their contiguous surfaces over a range of temperatures extending well below the lowest temperatures reasonably expected to be encountered and well above the highest temperatures reasonably expected to be encountered by the apparatus.

The region defining the path for fluid 112 typically is removed to form a groove in the first sheet of metallic material by mechanical cutting or by chemical machining.

While the forms of the invention herein disclosed constitute currently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

We claim:

1. Apparatus for exchanging heat between a heat conductive surface and an adjacent region or object, comprising a first cover plate at least an order of magnitude longer and wider than its thickness;

a middle plate substantially similar to the first cover plate, contiguous with, and joined to, the first cover plate over their coextensive surfaces;

a second cover plate substantially similar to and positioned opposite to the first cover plate, contiguous with, and joined to, the middle plate over their approximately rectangular coextensive surfaces;

the second cover plate having high heat conductivity;

the middle plate having a confined path therein for fluid to flow into, through, and out of;

the path for fluid being bounded on a first pair of opposite sides by inner surface portions of the cover plates, and one a second pair of opposite sides substantially perpendicular to the first pair by material in the middle plate;

the path for fluid being substantially longer than the perimeter of the coextensive surfaces of the plates, and comprising predominantly a double spiral substantially symmetrical about the centerline between one pair of parallel opposite sides of the coextensive surfaces of the plates and substantially symmetrical about the centerline between the other pair of parallel opposite sides of the coextensive surfaces of the plates, the midpoint of the double spiral lying on one said centerline; and wherein the thickness of the second cover plate is about one-fifth to one-third of the thickness of the center plate, and the apparatus comprises also an additional plate in intimate contact with the outer surface of the second cover plate over the region thereof opposite the region that is joined with the middle plate, the additional plate being thicker than the second cover plate, and the total thickness of the second cover plate plus the additional plate is about one-fourth to three-fourths of the separation distance between adjacent portions of the path for fluid.

2. Apparatus as in claim 1, wherein one pair of opposite sides of the coextensive surfaces is longer than the other pair, and the midpoint of the double spiral lies on the centerline between the longer sides.

3. Apparatus as in claim 1, wherein the path for fluid begins at an entering point near a side of the coextensive surfaces; guides the fluid in a roughly spiral inward course therefrom, proceeding first near, and approximately parallel to, the perimeter of the coextensive surfaces; then inward from, and approximately parallel to, the first portion of the path; and so on in the same manner to a midpoint near the center of the coextensive surfaces; from which midpoint the path continues in a roughly spiral outward course approximately parallel to, and midway between, the adjacent portions of the inward course to an exiting point in the vicinity of the entering point; so that the direction in which the fluid flows in each portion of the path is opposite to that in the portions adjacent thereto, the coolest fluid leaving is adjacent to the hottest fluid entering, the next to coolest fluid (just behind the fluid leaving) is adjacent to the next to hottest fluid (just ahead of the fluid entering), and so on in the same manner (with gradually warmer leaving fluid adjacent to gradually cooler entering fluid) toward the midpoint, where the fluid entering continues on as fluid leaving.

4. Apparatus as in claim 1, wherein the thickness of the second cover plate is about one-third to three-fourths of the separation distance between adjacent portions of the path for fluid.

5. Apparatus as in claim 1, wherein the separation distance between adjacent portions of the path for fluid is equal to about one-half to four-thirds of the width of the path.

6. Apparatus as in claim 1, wherein the first cover plate is thinner than the middle plate.

7. Apparatus as in claim 1, wherein each plate is metallic.

8. Apparatus as in claim 1, wherein the plates are flat.

9. Apparatus as in claim 1, wherein each plate has high heat conductivity, and wherein each plate has substantially the same temperature coefficient of expansion.

10. Apparatus as in claim 1, wherein each cover plate is made of the same material.

11. Apparatus as in claim 1, wherein the middle plate and one of the cover plates consist of a single piece of metal.

12. Apparatus as in claim 1, for heat a platen in cooking apparatus, comprising also means for conveying oil through the path for fluid at a velocity of about 1 to 10 feet per second, at a temperature upon entering the path of about 20 to 50 degrees Fahrenheit above the desired cooking temperature.

13. Apparatus as in claim 1, for heating a platen in cooking apparatus, comprising also means for conveying oil through the path for fluid at a velocity of about 1 to 10 feet per second, at a temperature upon entering the path of about 420 to 450 degrees Fahrenheit.

14. Apparatus for exchanging heat between a heat conductive surface and an adjacent region or object, comprising a first cover plate at least an order of magnitude longer and wider than its thickness;

a middle plate substantially similar to the first cover plate, contiguous with, and joined to, the first cover plate over their coextensive surfaces;

a second cover plate substantially similar to and positioned opposite to the first cover plate, contiguous with, and joined to, the middle plate over their approximately rectangular coextensive surfaces;

the second cover plate having high heat conductivity;

the middle plate having a confined path therein for fluid to flow into, through, and out of;

the path for fluid being bounded on a first pair of opposite sides by inner surface portions of the cover plates, and on a second pair of opposite sides substantially perpendicular to the first pair by material in the middle plate;

the path for fluid being substantially longer than the perimeter of the coextensive surfaces of the plates, and comprising predominantly a double spiral substantially symmetrical about the centerline between one pair of parallel opposite sides of the coextensive surfaces of the plates and substantially symmetrical about the centerline between the other pair of parallel opposite sides of the coextensive surfaces of the plates, the midpoint of the double spiral lying on one said centerline;

the separation distance between adjacent portions of the path for fluid being equal to about one-half to four-thirds of the width of the path; and the thickness of the second cover plate being about one-third to three-fourths of the separation distance between adjacent portions of the path for fluid; and means for conveying fluid through the path at a predetermined velocity and a predetermined temperature, upon entering the path, that provide approximately a selected substantially uniform temperature over the outer surface of the second cover plate adjacent to the path.

15. Apparatus as in claim 14, wherein one pair of opposite sides of the coextensive surfaces is longer than the other pair, and the midpoint of the double spiral lies on the centerline between the longer side.

16. Apparatus as in claim 14, wherein the path for fluid begins at an entering point near a side of the coextensive surfaces; guides the fluid in a roughly spiral inward course therefrom, proceeding first near, and approximately parallel to, the perimeter of the coextensive surfaces; then inward from, and approximately parallel to, the first portion of the path; and so on in the same manner to a midpoint near the center of the coextensive surfaces; from which midpoint the path continues in a roughly spiral outward course approximately parallel to, and midway between, the adjacent portions of the inward course to an exiting point in the vicinity of the entering point; so that the direction in which the fluid flows in each portion of the path is opposite to that in the portions adjacent thereto, the coolest fluid leaving is adjacent to the hottest fluid entering, the next to coolest fluid (just behind the fluid leaving) is adjacent to the next to hottest fluid (just ahead of the fluid entering), and so on in the same manner (with gradually warmer leaving fluid adjacent to gradually cooler entering fluid) toward the midpoint, where the fluid entering continues on as fluid leaving.

17. Apparatus as in claim 14, wherein the thickness of the second cover plate is about one-fifth to one-third of the thickness of the center plate.

18. Apparatus as in claim 14, for heating a platen in cooking apparatus, wherein the fluid conveying means comprises means for conveying oil through the path for fluid at a velocity of about 1 to 10 feet per second, at a temperature upon entering the path of about 20 to 50 degrees Fahrenheit above the desired cooking temperature.

19. Apparatus as in claim 14, for heating a platen in cooking apparatus, wherein the fluid conveying means comprises means for conveying oil through the path for fluid at a velocity of about 1 to 10 feet per second, at a temperature upon entering the path of about 420 to 450 degrees Fahrenheit.

* * * * *

UNITED STATES PATENT AND TRADEMARK OFFICE
CERTIFICATE OF CORRECTION

PATENT NO. : 5,287,919
DATED : February 22, 1994
INVENTOR(S) : George, II et al.

It is certified that error appears in the above-identified patent and that said Letters Patent is hereby corrected as shown below: Title page:

Item (75): Inventors:, after "Paul E. George, II," delete "Dublin" and insert - - Powell - -; after "John S. Barnhart," delete "Champaign, Ill.," and insert - - Houston, Texas - -.
Column 1, line 28, after "United States Patent", insert - - 5,247,874, issued Sept. 28, 1993 - -;
  line 30, after "paper", "Gas-Fired, Double-Sided Griddle . . .", should read - - "A Gas-Fired, Double-Sided Griddle . . . - -.
Column 4, line 12, after "46", "4B" should read - - 48 - -.
Column 10, line 44, in the equation, after "$-Q_{ij} +$", "M" should read - - $\dot{M}$ - -; and after "$Q_i -$", "M" should read - - $\dot{M}$ - -;
  line 49, in the equation, after "$Q_{ij} +$", "M" should read - - $\dot{M}$ - -, after "$Q_i -$", "M" should read - - $\dot{M}$ - -.
  line 53, "$T_j$" should read - - $T_i$ - -;
  line 54, "M" should read - - $\dot{M}$ - -.
Column 11, line 16, the third equation, every "M" should read - - $\dot{M}$ - -.
Column 15, line 19, after "and", "one" should read - - on - -.
Column 16, line 23, after "for", "heat" should read - - heating - -.

Signed and Sealed this

Ninth Day of August, 1994

Attest:

BRUCE LEHMAN

Attesting Officer        Commissioner of Patents and Trademarks